No. 711,210. Patented Oct. 14, 1902.
W. H. HONISS.
JAR SEALING APPARATUS.
(Application filed Jan. 5, 1901.)
(No Model.)
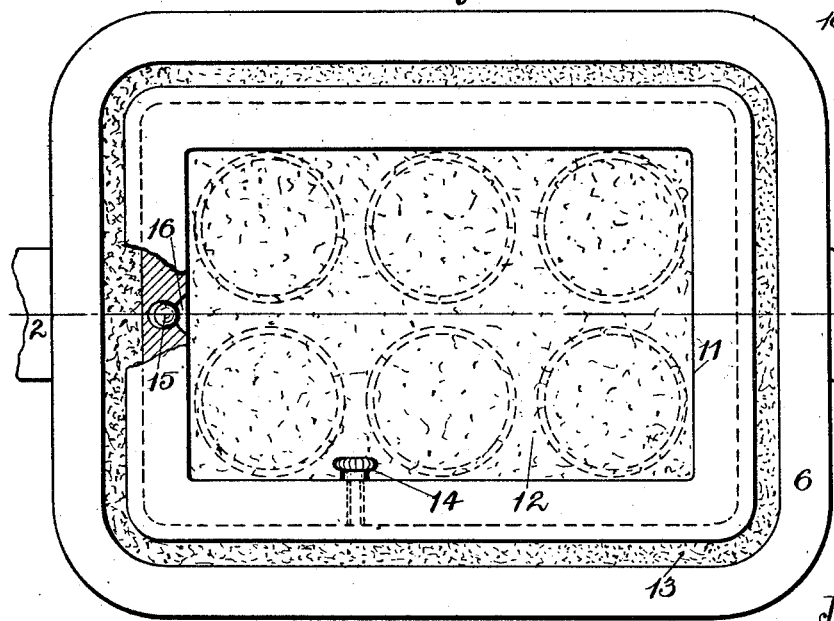
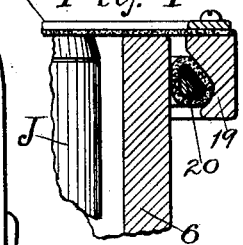
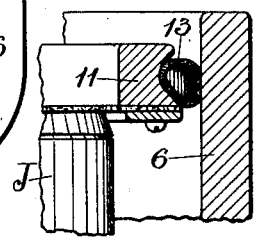
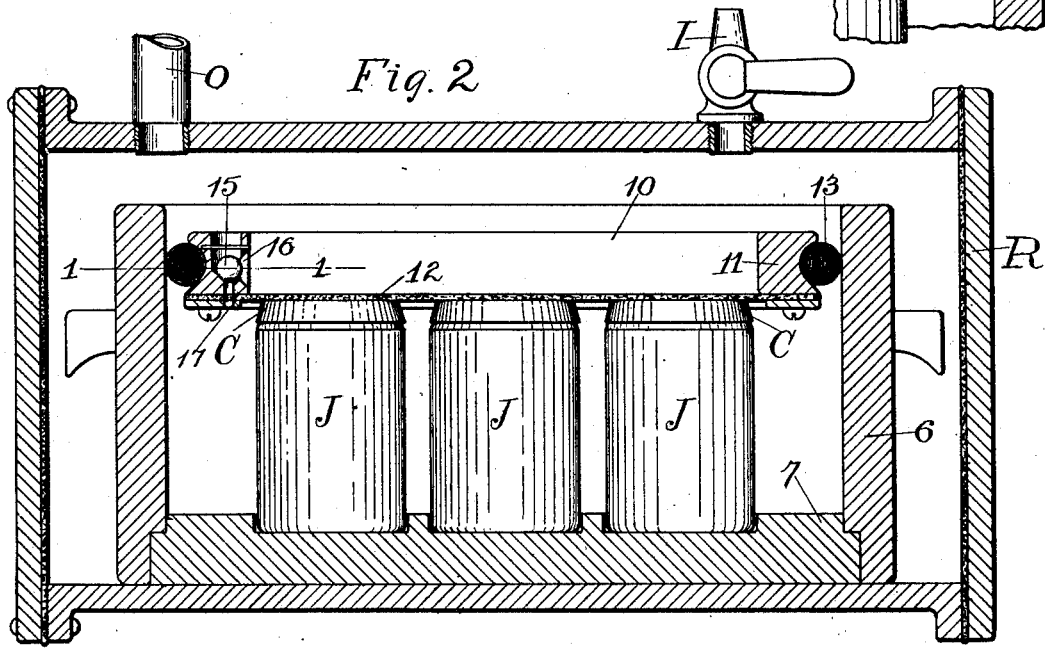
Witnesses:
Inventor:

UNITED STATES PATENT OFFICE.

WILLIAM H. HONISS, OF HARTFORD, CONNECTICUT, ASSIGNOR OF THREE-FOURTHS TO BEECH-NUT PACKING COMPANY, OF CANAJOHARIE, NEW YORK, A CORPORATION OF NEW YORK, AND WILLIAM A. LORENZ, OF HARTFORD, CONNECTICUT.

JAR-SEALING APPARATUS.

SPECIFICATION forming part of Letters Patent No. 711,210, dated October 14, 1902.

Application filed January 5, 1901. Serial No. 42,174. (No model.)

*To all whom it may concern:*

Be it known that I, WILLIAM H. HONISS, a citizen of the United States of America, and a resident of Hartford, in the county of Hartford and State of Connecticut, have invented certain new and useful Improvements in Jar-Sealing Apparatus, of which the following is a specification.

This invention is an improved apparatus for exhausting and hermetically sealing jars, cans, and similar receptacles.

Figure 1 is a plan view of this improved apparatus. Fig. 2 is a side view thereof in section, taken along the line 2 2 of Fig. 1 and representing the apparatus within a receiver in which it is placed for the exhausting and sealing operation. Fig. 3 is a fragmentary view illustrating the operation of the presser and gasket of Fig. 2 under the operation of the readmitted air. Fig. 4 is a similar fragmentary view showing a modified form of the presser under conditions similar to those of Fig. 3.

Jars of this class are usually closed by means of a cap, an air-tight closure-joint being made between the jar and the cap by means of an annular gasket of rubber or similar material. In order to allow of the ready exit of the air from the interior of the jar during the exhausting operation, it is desirable to place the caps lightly upon the gaskets instead of forcing them down, and while thus lightly resting upon the gaskets it frequently happens that the annular space between the jar and the cap is not entirely closed on account of the irregularities and inequalities in the jars, the gaskets, or the caps. In such a case the caps would be supported only upon the highest or largest portions of the gasket, leaving intermediate openings which, while favorable for the ready exit of the air from the jars, are liable to allow the readmitted air-pressure to enter the jars before it forces the caps down hard enough or far enough to close those openings. Moreover, the caps when thus loosely and irregularly supported upon the higher or larger portions of the gasket are liable to become tilted, so that they do not finally bear with a uniform pressure around the gasket, even when subsequently forced down by the pressure sufficiently to seal the jar for the time being, and are therefore liable sooner or later to become unsealed, and thus allow the contents of the jar to be spoiled by contact with the air.

It is the object of this invention to provide an apparatus whereby the caps may, if desired, be allowed to rest loosely upon their gaskets without becoming tilted during the exhausting operation and whereby upon the readmission of air to the apparatus the caps may automatically be forced squarely down upon the gaskets and seal the jars while excluding the readmitted air from reaching and reëntering the joint.

This apparatus consists of an open-sided jar-receptacle 6 for partially inclosing the jars J, which rest upon a base 7. The base may be integral with the side of the receptacle 6, or may be a part of the receiver R of the vacuum-producing apparatus. A jar-presser 10, which is here shown to be resting upon the tops of the caps, is fitted to the walls of the receptacle with a practically air-tight joint, so as to slide thereon under the pressure of the readmitted air. This presser is here shown to consist of a substantially inflexible frame 11, to which is secured a flexible diaphragm 12, preferably of rubber or similar material. The joint between the presser and the walls of the receptacle is closed by means of an endless and preferably air-tight expansible hollow gasket 13, similar to a hose-pipe as to its construction and material. This gasket may be provided with an inflating-valve 14, if it is desired to use a pressure above or below that of the atmosphere. When this joint is likely to be perfectly air-tight, a return check-valve is preferably provided, which is here shown to consist of a ball 15, located in a passage-way leading through the presser, which is recessed at 16, to enable the ball to be displaced, and thus open the passage when it is desired to readmit air to the interior of the receptacle. This return check-valve may obviously be located in one of the walls or in the base of the apparatus.

In employing this apparatus the filled jars are placed in position, the caps are seated upon their gaskets, and the presser 10 is pushed down far enough so that the diaphragm 12 rests either lightly against the caps or close enough to them to prevent them from becoming tilted, if they should be lifted by the exhausting operation. The apparatus thus prepared is placed within the receiver R of a vacuum apparatus, having an outlet or exhaust pipe O and an inlet-valve I. During the exhausting operation the air from the interior of the jars passes freely out between the caps and their gaskets and through the aperture 17 of the return check-valve. As the air becomes rarefied, and thus diminishes the pressure within the receiver and the apparatus, the gasket 13 expands by the elasticity of its material or of the inclosed air, as the case may be, thereby more closely sealing the joint between the presser and the walls of the receptacle. When a suitable vacuum has been produced, air is readmitted through the inlet-valve I and operates to force the presser and the caps downwardly, the flexibility of the diaphragm enabling the pressure to be applied equally upon all of the jars, in spite of the variations which often exist in their respective heights. Inasmuch as the readmitted air is excluded from the interior of the receptacle below the presser, its operation upon the outer side of the presser is automatic and forcible. The gasket 13 is distorted by the readmitted pressure, as illustrated in Fig. 3, and maintains the air-tight joint between the presser and the walls of the receptacle. The apparatus may now be removed from the receiver and the valve 15 be opened to readmit air to the interior of the receptacle, whereupon the presser may be removed, the jars taken out, and a new lot of jars substituted for a repetition of the operation.

In the modified construction shown in Fig. 4 the presser 10ª extends over the side walls of the receptacle 6, the frame 19 and the gasket 20 being upon the outer side of those walls. The function and mode of operation of this modified construction are, however, like that already described, excepting that the gasket 20 is pressed upwardly between the receptacle and the frame by the readmitted air, as shown in Fig. 4, instead of downwardly, as in Fig. 3.

The gasket 13, whether solid or hollow, may be modified in form to adapt it to any practical environment. As shown in the plan view, the interior corners of the receptacle 6 and the exterior corners of the frame 11 are rounded to avoid bending the gasket sharply at those corners. When a hollow gasket is employed, the pressure of its inclosed air may be varied to any desired extent to adapt it to various uses. The entire apparatus may also be modified as to construction and arrangement in many ways which will suggest themselves to those skilled in the art to suit the number and kind of jars to be operated upon or to suit other conditions of service. Where the nature of their contents permits, the jars may be inverted or may be turned upon their sides and the presser be adapted to bear against either end, since it is immaterial which end receives the pressure, so long as the jar and the cap are pressed together.

I claim as my invention—

1. In a jar-sealing apparatus, the combination of a jar-receptacle, a jar-presser, a flexible gasket forming a joint between the receptacle and the presser, means for exhausting the air from both sides of the presser, and means for readmitting the air-pressure and directing it against the outer side of the presser.

2. In a jar-sealing apparatus, the combination of an open-sided jar-receptacle, a jar-presser with an expansible gasket for closing the open side of the receptacle, means for exhausting the air from both sides of the presser, and means for readmitting the air-pressure and directing it against the outer side of the presser.

3. In a jar-sealing apparatus, the combination of a jar-receptacle, a jar-presser provided with a flexible diaphragm, an expansible gasket between the presser and receptacle, means for exhausting the air from both sides of the presser, and means for readmitting the air-pressure and directing it against the outer side of the presser.

4. In combination with an exhausting-receiver, a removable open-sided jar-receptacle, a jar-presser provided with a flexible gasket for hermetically closing the open side of the receptacle, and a return check-valve.

Signed at Hartford, Connecticut, this 29th day of December, 1900.

WM. H. HONISS.

Witnesses:
WILLIAM A. LORENZ,
JOS. MERRITT.